US012600211B2

(12) United States Patent
Takahashi et al.

(10) Patent No.: US 12,600,211 B2
(45) Date of Patent: Apr. 14, 2026

(54) VEHICLE WINDOW PART

(71) Applicant: AGC Inc., Tokyo (JP)

(72) Inventors: Kazuhiro Takahashi, Tokyo (JP); Ryoichi Urata, Tokyo (JP); Naonori Hatta, Tokyo (JP); Takafumi Inoue, Tokyo (JP)

(73) Assignee: AGC INC., Tokyo (JP)

( * ) Notice: Subject to any disclaimer, the term of this patent is extended or adjusted under 35 U.S.C. 154(b) by 336 days.

(21) Appl. No.: 18/200,972

(22) Filed: May 23, 2023

(65) Prior Publication Data

US 2023/0294497 A1 Sep. 21, 2023

Related U.S. Application Data

(63) Continuation of application No. PCT/JP2021/042456, filed on Nov. 18, 2021.

(30) Foreign Application Priority Data

Nov. 24, 2020 (JP) ................................. 2020-194015

(51) Int. Cl.
B60J 10/70 (2016.01)
B60J 1/00 (2006.01)
(Continued)

(52) U.S. Cl.
CPC .............. B60J 10/70 (2016.02); B60J 1/007 (2013.01); B60J 1/10 (2013.01); B60J 10/35 (2016.02); B60J 10/36 (2016.02)

(58) Field of Classification Search
CPC ... B60J 10/70; B60J 10/35; B60J 10/36; B60J 1/007; B60J 1/10
(Continued)

(56) References Cited

U.S. PATENT DOCUMENTS 11,639,086 B2 * 5/2023 Blottiau ................. B60J 10/265
49/459
11,780,300 B2 * 10/2023 Hatta ..................... B60J 5/0402
49/404
(Continued)

FOREIGN PATENT DOCUMENTS

CN 111002801 A * 4/2020 ............... B60J 1/10
CN 119058355 A * 12/2024 ............. B60J 10/76
(Continued)

OTHER PUBLICATIONS

International Searching Authority, "International Search Report," issued in connection with International Patent Application No. PCT/JP2021/042456, dated Jan. 11, 2022.
(Continued)

*Primary Examiner* — Hilary L Gutman
(74) *Attorney, Agent, or Firm* — Foley & Lardner LLP

(57) ABSTRACT

A vehicle window parts assembly includes a fixed window glass with a division bar, the fixed window glass with a division bar including a fixed window glass having an outer periphery, a resin frame attached to the periphery, and a division bar attached to a surface of the resin frame opposite to the fixed window glass and having a guide portion formed therein, such that the resin frame and the division bar are integrally molded to the fixed window glass as an integral molded product; and a glass run including a first glass run vertical side, a second glass run vertical side, and a glass run upper side connecting the first glass run vertical side and the second glass run vertical side; wherein the glass run further includes a first coupler, and the fixed window glass with a division bar further includes a second coupler.

14 Claims, 14 Drawing Sheets

(51) Int. Cl.
_B60J 1/10_ (2006.01)
_B60J 10/35_ (2016.01)
_B60J 10/36_ (2016.01)

(58) Field of Classification Search
USPC .................................................... 296/146.15
See application file for complete search history.

(56) References Cited

U.S. PATENT DOCUMENTS

| | | | | |
|---|---|---|---|---|
| 2003/0168882 | A1 * | 9/2003 | Naito | B60J 10/78 |
| | | | | 296/146.2 |
| 2007/0175102 | A1 * | 8/2007 | Teramoto | B60J 10/30 |
| | | | | 49/441 |
| 2020/0338972 | A1 * | 10/2020 | Zia | B60J 10/70 |

FOREIGN PATENT DOCUMENTS

| | | | | | |
|---|---|---|---|---|---|
| DE | 10 2011 080 426 | A1 | | 2/2013 | |
| EP | 2 707 191 | B1 | | 3/2019 | |
| GB | 2393752 | A | * | 4/2004 | B60J 10/79 |
| GB | 2631911 | A | * | 1/2025 | B60J 10/78 |
| JP | H09-11754 | A | | 1/1997 | |
| JP | 2595126 | B2 | * | 3/1997 | B60J 10/235 |
| JP | 2001-071752 | A | | 3/2001 | |
| JP | 2003260937 | A | * | 9/2003 | B60J 5/0406 |
| JP | 2005-096668 | A | | 4/2005 | |
| JP | 3758909 | B2 | * | 3/2006 | B60J 1/10 |
| JP | 3992743 | B2 | | 10/2007 | |
| JP | 4228859 | B2 | * | 2/2009 | |
| JP | 4383638 | B2 | * | 12/2009 | B60J 10/30 |
| JP | 2016-052826 | A | | 4/2016 | |
| JP | 2017210048 | A | * | 11/2017 | |
| JP | 2018083546 | A | * | 5/2018 | B29C 45/14434 |
| JP | 2018118652 | A | * | 8/2018 | B60J 10/36 |
| JP | 6573681 | B2 | | 9/2019 | |
| JP | 6583389 | B2 | * | 10/2019 | |
| JP | 2021133846 | A | * | 9/2021 | |
| KR | 20020016693 | A | * | 3/2002 | |
| KR | 2011021124 | A | * | 3/2011 | |
| KR | 20150053661 | A | * | 5/2015 | B60J 1/007 |
| KR | 20150061050 | A | * | 6/2015 | B60J 1/10 |
| WO | WO-2014084125 | A1 | * | 6/2014 | B60R 13/04 |
| WO | WO-2019074092 | A1 | * | 4/2019 | B60R 13/04 |
| WO | WO-2019/116818 | A1 | | 6/2019 | |
| WO | WO-2019/245819 | A1 | | 12/2019 | |
| WO | WO-2021/180954 | A1 | | 9/2021 | |

OTHER PUBLICATIONS

International Searching Authority, "Written Opinion," issued in connection with International Patent Application No. PCT/JP2021/042456, dated Jan. 11, 2022.

* cited by examiner

50

54F   26A   24A
26D
54
26C
24
24D
22
54D
54A
106
24C
54E   54G
54C
26
26E
54B   26B   54H   24B (Out)

(F) ←———•———→ (R)

(In)

VEHICLE WINDOW PART

This application is a continuation of PCT Application No. PCT/JP2021/042456, filed on Nov. 18, 2021, which is based upon and claims the benefit of priority from Japanese Patent Application No. 2020-194015 filed on Nov. 24, 2020. The contents of those applications are incorporated herein by reference in their entireties.

TECHNICAL FIELD

The present invention relates to a vehicle window parts assembly.

BACKGROUND ART

Vehicle window parts assemblies have been known, which include a glass run, and a fixed window glass with a division bar such that the glass run and the window glass are disposed as one unit (see Patent Document 1 listed below).

PRIOR ART DOCUMENTS

Patent Documents

Patent Document 1: Japanese Patent No. 3992743

DISCLOSURE OF INVENTION

Technical Problem

The vehicle window parts assembly disclosed by Patent Document 1 has caused a problem in that the vehicle window parts assembly has an inefficient logistics because of being stored or transported in such a state to be disposed as one unit. The glass run and the fixed window glass with a division bar may be prepared as separate members. In the latter case, unless the glass run and the fixed window glass with a division bar are accurately assembled together, the vehicle window parts assembly causes a problem in failing to exhibit a required function, such as water tightness.

The present invention is proposed in consideration of the problem. It is an object of the present invention to provide a vehicle window parts assembly, which is capable of accurately assembling a glass run and a separate, fixed window glass with a division bar, and of exhibiting a required function, such as water tightness.

Solution to Problem

The vehicle window parts assembly according to a first mode includes a fixed window glass with a division bar, the fixed window glass with a division bar including a fixed window glass having an outer periphery, a resin frame attached to the periphery, and a division bar attached to a surface of the resin frame opposite to the fixed window glass and having a guide portion formed therein, such that the resin frame and the division bar are integrally molded to the fixed window glass as an integral molded product; and a glass run including a first glass run vertical side, a second glass run vertical side, and a glass run upper side connecting the first glass run vertical side and the second glass run vertical side; wherein the glass run further includes a first coupler, and the fixed window glass with a division bar further includes a second coupler to be coupled to the first coupler such that the first coupler and the second coupler are coupled together; wherein the guide portion receives either one of the first glass run vertical side and the second glass run vertical side; wherein the guide portion is formed in a C-shape in section such that the guide portion has both edges formed so as to have a decreasing distance therebetween; and wherein the distance between both edges of the guide portion is shorter than a width of the first glass run vertical side or the second glass run vertical side.

The vehicle window parts assembly according to a second mode includes a fixed window glass with a division bar, the fixed window glass with a division bar including a fixed window glass having an outer periphery, a resin frame attached to the periphery, and a division bar attached to a surface of the resin frame opposite to the fixed window glass and having a guide portion formed therein, such that the resin frame and the division bar are integrally molded to the fixed window glass as an integral molded product; and a glass run including a first glass run vertical side, a second glass run vertical side, and a glass run upper side connecting the first glass run vertical side and the second glass run vertical side and having an extension portion extending to a position where the extension portion at least partially overlaps with the resin frame as seen in front view; wherein the extension portion further includes a first coupler, and the fixed window glass with a division bar further includes a second coupler to be coupled to the first coupler such that the first coupler and the second coupler are coupled together; wherein the guide portion receives either one of the first glass run vertical side and the second glass run vertical side; wherein the guide portion is formed in a C-shape in section such that the guide portion has both edges formed so as to have a decreasing distance therebetween; and wherein the distance between both edges of the guide portion is shorter than a width of the first glass run vertical side or the second glass run vertical side.

Advantageous Effects of Invention

The vehicle window parts assembly according to these modes of the present invention can not only accurately assemble the glass run, and the separate, fixed window glass with a division bar, but also exhibit a required function, such as water tightness.

DESCRIPTION OF EMBODIMENTS

Now, some embodiments of the present invention will be described in reference to the accompanying drawings.

In Description, the wordings of "upward (U)", "downward (D)", "inner (In)", "outer (Out)", "forward (F)", "rearward (R)" and "left (L)", which are indicative of directions or positions, mean "upward (U)", "downward (D)", "inner (In)", "outer (Out)", "forward (F)", "rearward (R)" and "left (L)" when the vehicle window parts assembly is mounted to a vehicle.

First Embodiment

Figure 1:
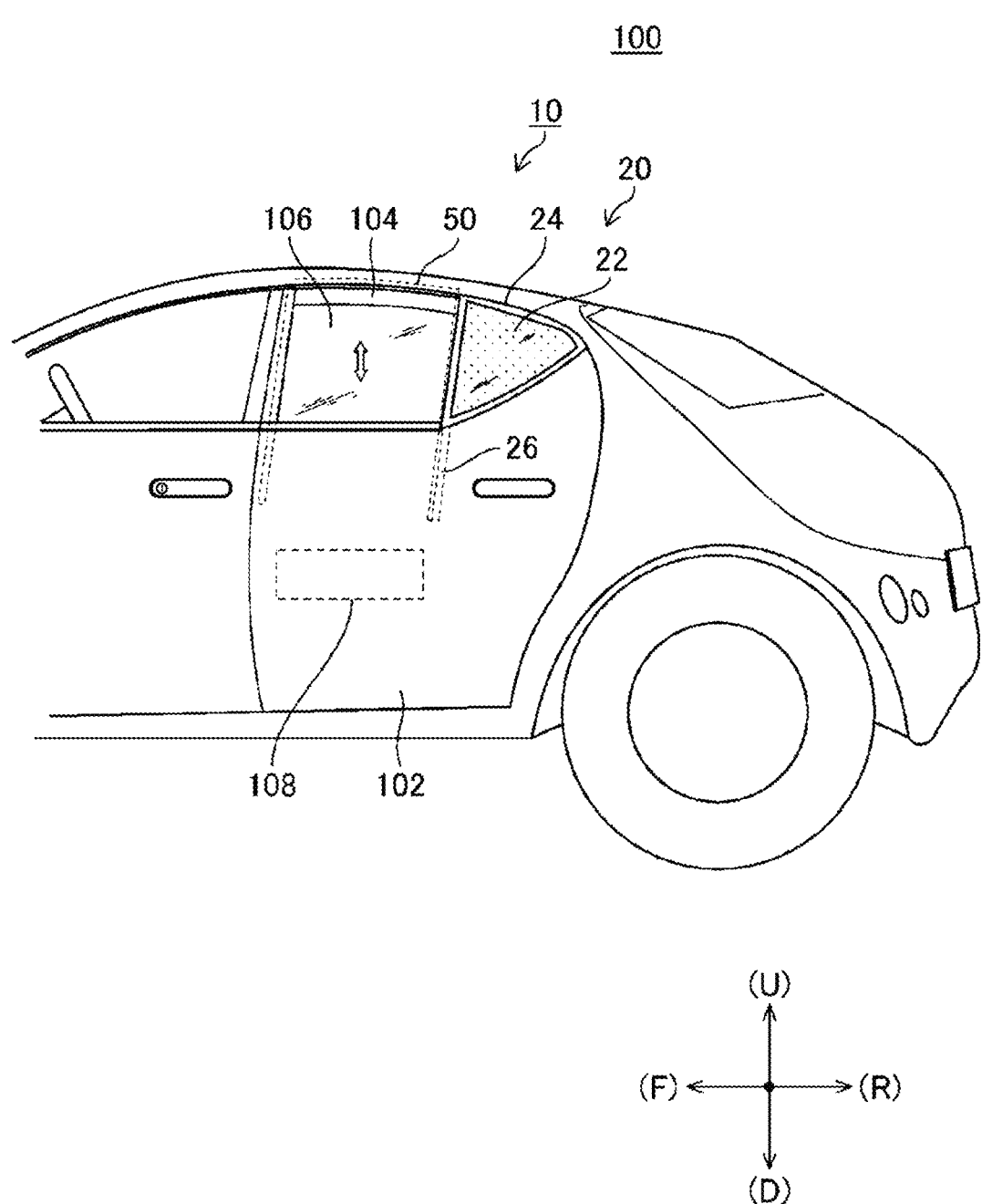
FIG. 1 is a left side view of a vehicle, to which the vehicle window parts assembly according to a first embodiment is mounted.

FIG. 1 is a left side view of a vehicle 100, to which the vehicle window parts assembly 10 according to a first embodiment of the present invention is mounted. The vehicle window parts assembly 10 is mounted to a window opening 104 of a rear side door 102 as one example. The vehicle window parts assembly 10 includes a fixed window glass with a division bar 20, and a glass run 50. The fixed window glass with a division bar 20 includes a fixed window glass 22, a resin frame 24 attached to an outer periphery of the fixed window glass 22, and a division bar 26 attached to the resin frame 24.

The division bar 26 is formed in an elongated shape extending upward and downward. The window opening 104 is divided into a forward opening and a rearward opening by the division bar 26. In the vehicle window parts assembly 10 illustrated in FIG. 1, the fixed window glass 22 with the resin frame 24 is disposed in the rearward opening of the window opening 104. In other words, the division bar 26 is attached to a side of the resin frame 24 opposite to the fixed window glass 22.

In the vehicle window parts assembly 10 illustrated in FIG. 1, the glass run 50 (shown in dotted lines) is disposed in the forward opening of the window opening 104. The glass run 50 is attached to the fixed window glass with a division bar 20 as described later.

The window opening 104 has an elevating window glass 106 disposed in the forward opening so as to be vertically and slidably engaged in the glass run 50. The elevating window glass 106 is vertically elevated and lowered by an elevating system 108 disposed in the rear side door 102.

The glass run 50 includes lips to have touch with a vehicle outer surface and a vehicle inner surface of the elevating window glass 106 as described later. The glass run 50 functions as a sealing member to prevent rain water or noise from entering a vehicle inner side.

Figure 2:
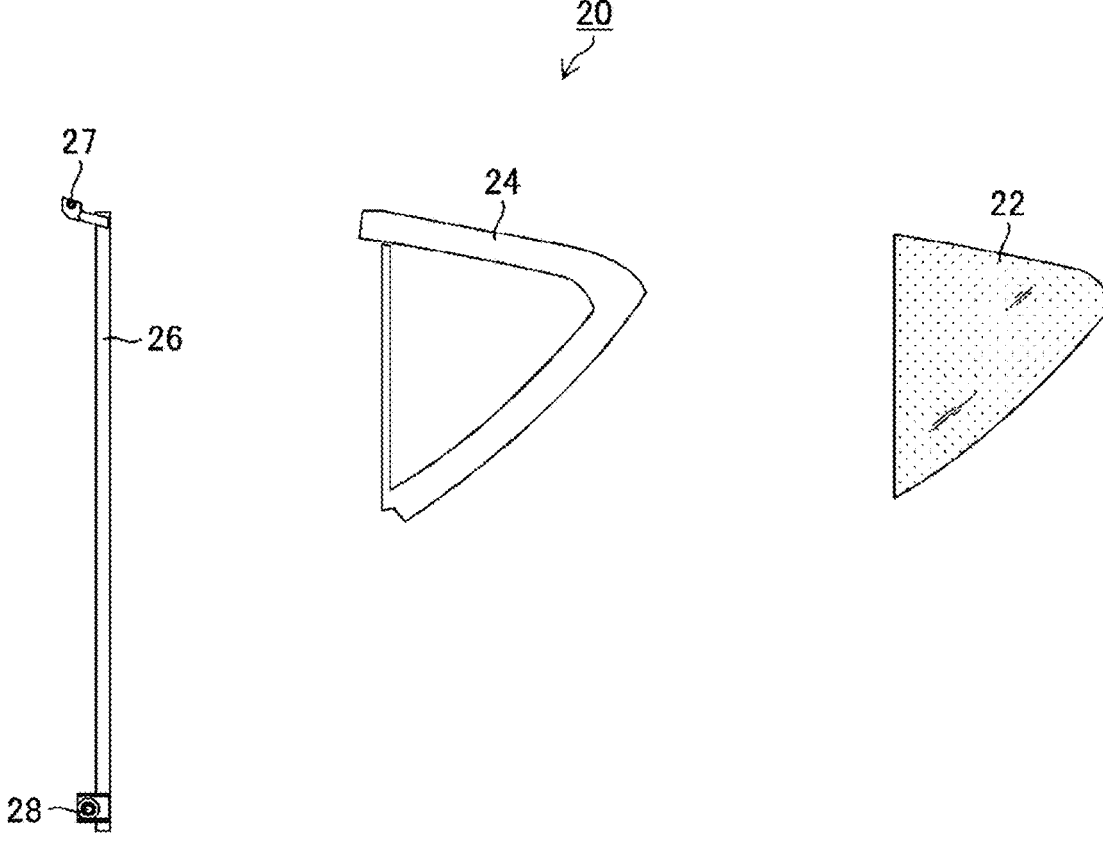
FIG. 2 is an exploded view of the fixed window glass with a division bar according to the first embodiment.

FIG. 2 is an exploded view of the fixed window glass with a division bar 20. The fixed window glass with a division bar 20 includes the fixed window glass 22, the resin frame 24 attached to the outer periphery of the fixed window glass 22, and the division bar 26 attached to the resin frame 24.

The fixed window glass 22 may be made of inorganic glass or organic glass. As the inorganic glass, for example, soda-lime glass, aluminosilicate glass, borosilicate glass, alkali-free glass or quartz glass is applicable without any limitation. Among them, soda-lime glass may be particularly preferable from the viewpoint of production cost and moldability.

When the fixed window glass 22 is made of inorganic glass, the fixed window glass 22 may be made of either non-tempered glass or tempered glass. The tempered glass may be either glass tempered by air quenching, or chemically tempered glass. The non-tempered glass is one that is produced by forming molten glass in a plate shape and annealing the formed molten glass. The tempered glass is one that is produced by forming a compressive stress layer in the surface of non-tempered glass. The tempered glass may be either physically tempered glass (such as glass tempered by air quenching), or chemically tempered glass. When the tempered glass is physically tempered glass, the glass surface may be tempered by, for example, conducting an operation except annealing, so as to quench a glass plate uniformly heated for bending, from a temperature close to its softening point such that a temperature difference is generated between the glass surface and the inside of the glass to form a compressive stress layer in the glass surface. In contrast, when the tempered glass is chemically tempered glass, the glass surface may be tempered by causing a compressive stress in the glass surface by ion exchange treatment or the like after completion of a bending operation. Or glass that absorbs ultra-violet rays or infrared rays may be used. Although the tempered glass may be preferably transparent, a glass plate that is colored to such a degree not to impair transparency may be used.

When the fixed window glass 22 is made of organic glass, a transparent resin, such as polycarbonate, an acrylic resin (for example, polymethyl methacrylate), polyvinyl chloride, or polystyrene, may be mentioned as the material for the organic glass.

The fixed window glass 22 may be made of laminated glass wherein at least two glass plates are bonded together via an interlayer. The interlayer of the laminated glass may be made of a known film of PVB (poly vinyl butyral) or EVA (ethylene vinyl acetate copolymer resin), for example. The interlayer of the laminated glass may be transparent or colored. The interlayer may have two or more layers.

The fixed window glass 22 may be formed in a substantially triangular shape as seen in plan view. It should be noted that there is no particular limitation to the shape of the fixed window glass 22 as seen in plan view.

The fixed window glass 22 may be formed in a bent shape so as to be convex toward outside the vehicle when being mounted to the vehicle. The fixed window glass 22 may be formed in a single bent shape bent only in a single direction or a compound bent shape bent in two orthogonal directions.

The fixed window glass 22 may be bent by gravity bending, press bending, roller bending or the like. There is no particular limitation to the formation of the fixed window glass 22. For example, when the fixed window glass is made of inorganic glass, it is preferable to use a glass plate formed by a float process or the like.

There is no particular limitation to the thickness of the fixed window glass 22. The fixed window glass has a thickness of preferably at least 0.5 mm and at most 5.0 mm.

The material forming the resin frame 24 may be a thermoplastic elastomer containing, for example, PP (polypropylene resin) or PVC (polyvinyl chloride resin) as a main component.

The material forming the division bar 26 may be a thermoplastic elastomer including, for example, PP (polypropylene resin) or PVC (polyvinyl chloride resin) as a main component, as in the resin frame 24. The thermoplastic elastomer may be a thermoplastic elastomer, which has fibers, such as glass fibers or carbon fibers, contained therein. The material forming the division bar 26 may be made of a metal.

The division bar 26 may include fixing members 27 and 28 on its upper and lower ends. The division bar 26 may be fixed to the rear side door 102 (not shown in FIG. 2) via the fixing members 27 and 28.

The fixed window glass with a division bar 20 includes the fixed window glass 22, the resin frame 24, and the division bar 26. The fixed window glass with a division bar 20 is an integrally molded product wherein the resin frame 24 is integrally molded to the fixed window glass 22 by injection molding. The fixed window glass with a division bar may be configured such that the division bar 26 is additionally assembled to the integrally molded product of the resin frame 24 and the fixed window glass 22. The fixed window glass with a division bar may be an integrally molded product wherein the resin frame 24 and the division bar 26 are integrally molded to the fixed window glass 22 by insert molding or two-color molding.

Figure 3:
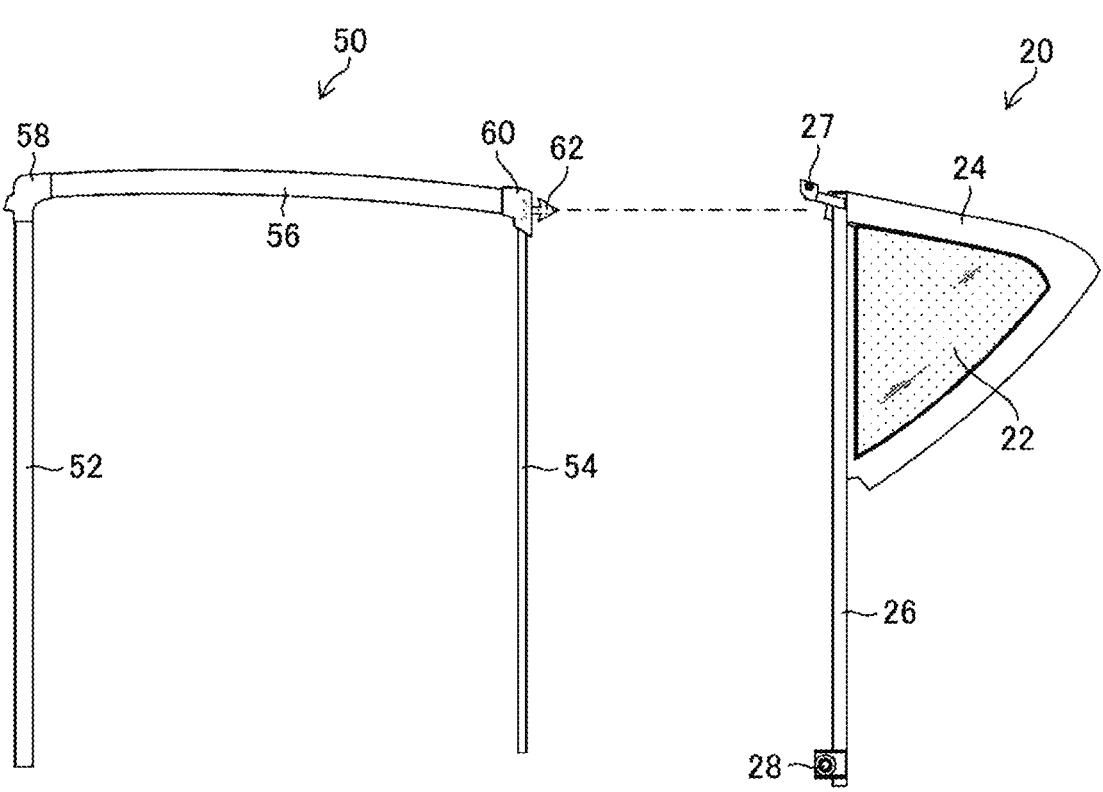
FIG. 3 is an exploded view of the vehicle window parts assembly according to the first embodiment.

FIG. 3 is an exploded view of the vehicle window parts assembly 10 according to the first embodiment. The glass run 50 includes a first glass run vertical side 52, a second glass run vertical side 54, and a glass run upper side 56 connecting the first glass run vertical side 52 and the second glass run vertical side 54. The glass run 50 illustrated in FIG. 3 further includes a forward connection portion 58 connecting an upper end of the first glass run vertical side 52 and a forward end of the glass run upper side 56, and a rearward connection portion 60 connecting an upper end of the second glass run vertical side 54 and a rearward end of the glass run upper side 56. Each of the first glass run vertical side 52 and the second glass run vertical side 54 is formed in an elongated shape extending upward and downward. The glass run upper side 56 is formed in an elongated shape extending in a longitudinal direction.

The glass run 50 may be made of an elastic member because of being required to function as a sealing member. The elastic member may be preferably made of a resin material, e.g., ethylene-propylene-diene rubber (EPDM), or a thermoplastic elastomer, such as an olefin-based thermoplastic elastomer (TPO). It should be noted that the material for the glass run is not limited to theses resin materials.

As described above, the fixed window glass with a division bar 20 is configured as an integrally molded product including the fixed window glass 22, the resin frame 24 and the division bar 26, and is treated as a single product. The glass run 50 is treated as another single product.

In the first embodiment, it is possible to apply suitable packages to the fixed window glass with a division bar 20 and the glass run 50, respectively, so as to improve logistic efficiency because the fixed window glass and the glass run are separately stored and transported.

As illustrated in FIG. 3, the glass run 50 includes a clip 62 as a first coupler for reliable and easy assembling. The clip 62 extends toward the fixed window glass with a division bar 20.

Figure 4:
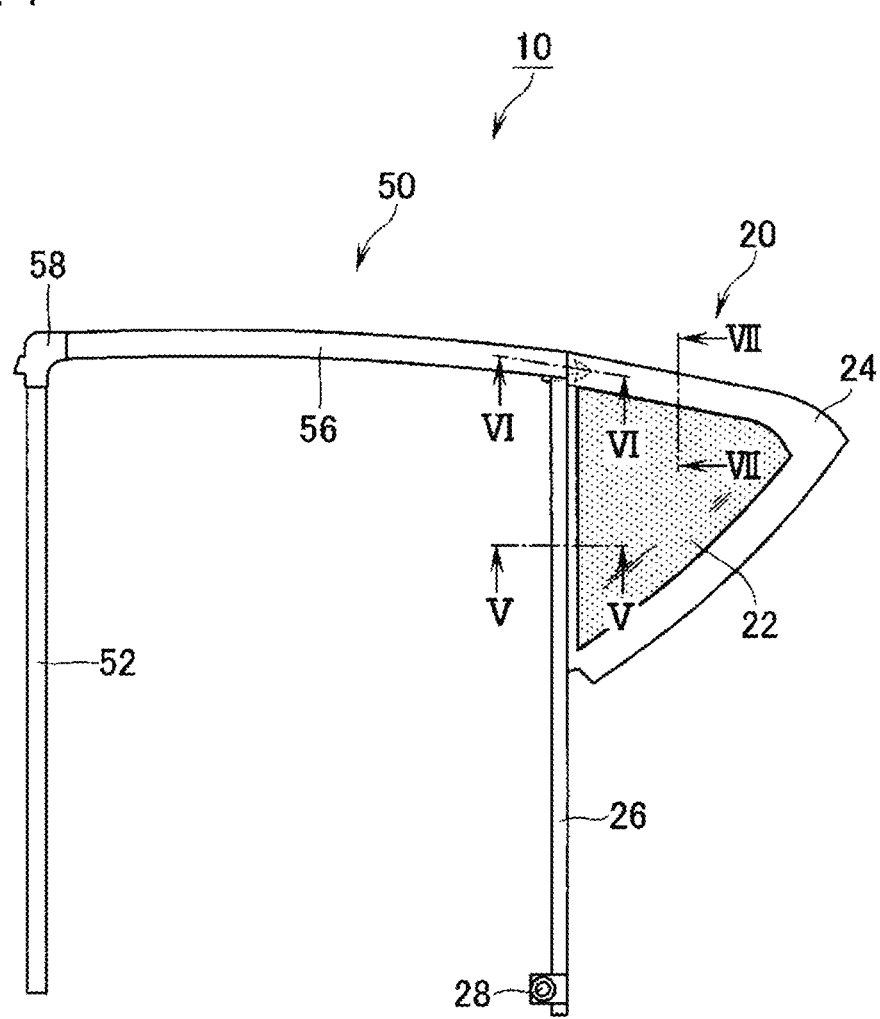
FIG. 4 is a front view of the vehicle window parts assembly according to the first embodiment.
Figure 5:
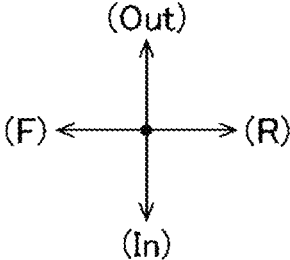
FIG. 5 is a cross-sectional view taken along line V-V of FIG. 4.
Figure 6:
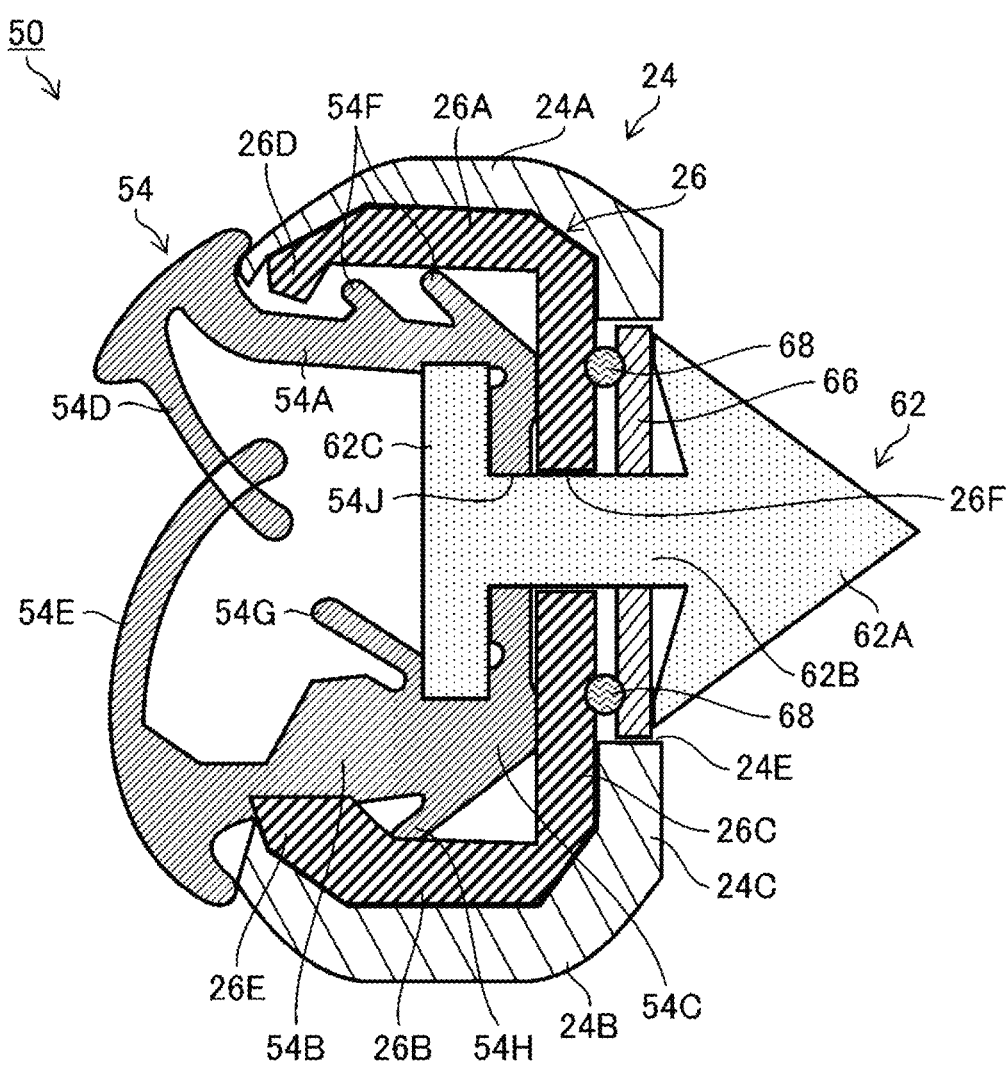
FIG. 6 is a cross-sectional view taken along line VI-VI of FIG. 4.
Figure 6:
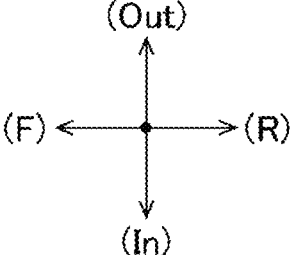
Figure 7:
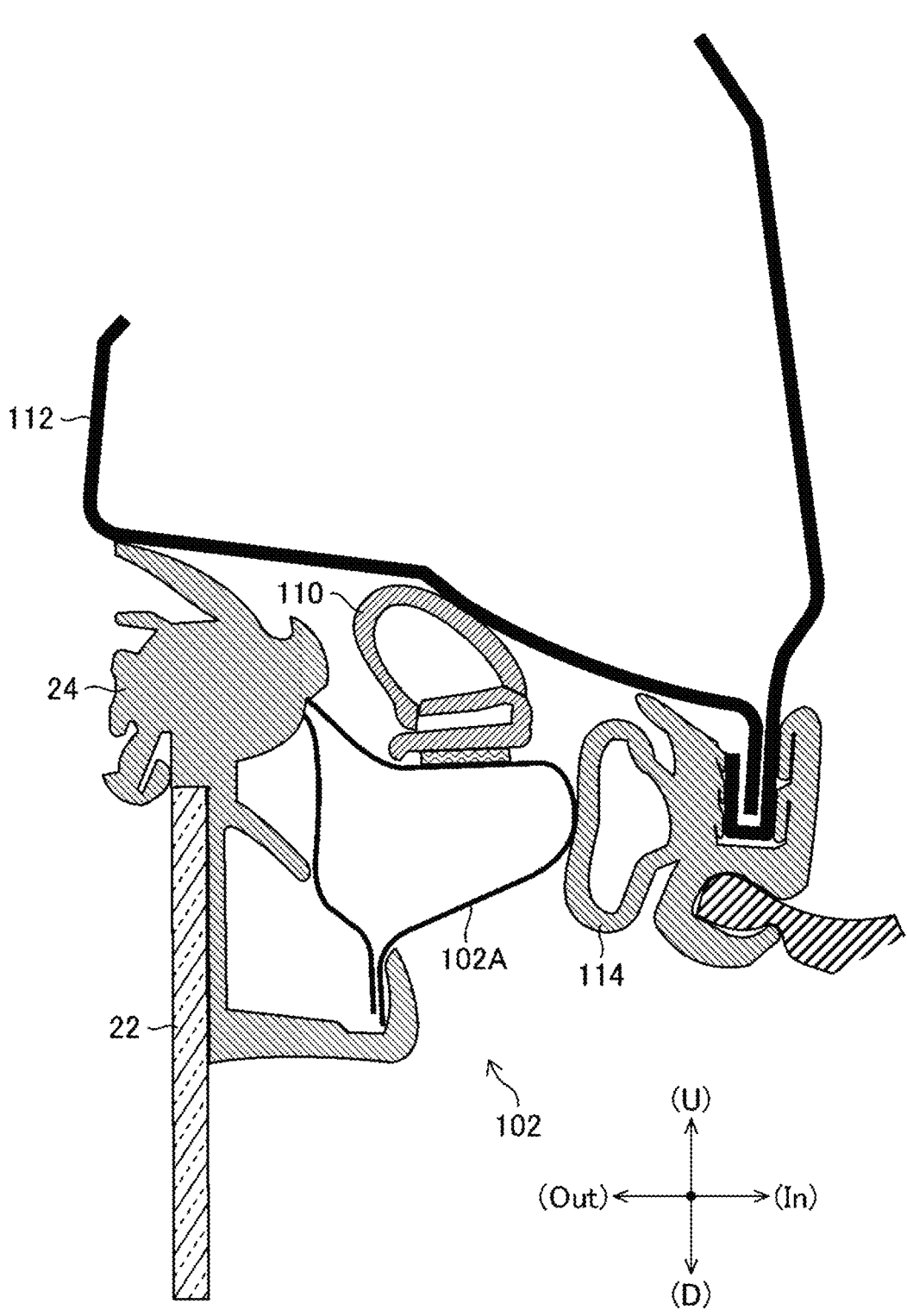
FIG. 7 is a cross-sectional view taken along line VII-VII of FIG. 4.

FIG. 4 is a front view of the vehicle window parts assembly 10 according to the first embodiment. FIG. 5 is a cross-sectional view taken along line V-V of FIG. 4. FIG. 6 is a cross-sectional view taken along line VI-VI of FIG. 4. FIG. 7 is a cross-sectional view taken along line VII-VII of FIG. 4.

The fixed window glass with a division bar 20 and the glass run 50 are separately transported to a factory or the like. As illustrated in FIG. 4, the fixed window glass with a division bar 20 and the glass run 50 are assembled together as the vehicle window parts assembly 10 there.

As illustrated in FIG. 5, the resin frame 24 is attached to the outer periphery of the fixed window glass 22. The resin frame 24 includes a first wall portion 24A disposed on a vehicle outer side, a second wall portion 24B disposed on a vehicle inner side so as to be apart from the first wall portion 24A with a certain distance, and a connection portion 24C connecting a rearward end of the first wall portion 24A and a rearward end of the second wall portion 24B.

The resin frame 24 includes a fixing portion 24D, which clamps a peripheral edge area of the fixed window glass 22 between inner and outer surfaces of the fixed window glass 22. The fixing portion 24D includes a channel having three wall surfaces, which face the outer surface, the inner surface and an end surface of the fixed window glass 22.

The resin frame 24 is formed so as to be open forward in a C-shape as seen in the cross-sectional view illustrated in FIG. 5, which is defined by the first wall portion 24A, the second wall portion 24B and the connection portion 24C. The first wall portion 24A and the second wall portion 24B are formed in such a shape that the distance between forward edges of both wall portions decreases as seen in section.

The division bar 26 is attached in a space of the resin frame 24 opposite to the fixed window glass 22. The resin frame 24 and the division bar 26 are integrally molded together as described above. The division bar 26 includes a first wall portion 26A disposed on the vehicle outer side, a second wall portion 26B disposed on the vehicle inner side so as to be apart from the first wall portion 26A with a certain distance, and a connection portion 26C connecting a rearward end of the first wall portion 26A and a rearward end of the second wall portion 26B.

The division bar 26 has a guide portion formed so as to be open forward in a C-shape as seen in the cross-sectional view illustrated in FIG. 5, which is defined by the first wall portion 26A, the second wall portion 26B and the connection portion 26C. The first wall portion 26A and the second wall portion 26B are formed in such a shape that the distance between both edges (leading edge 26D and leading edge 26E) decreases as seen in section of the guide portion.

In FIG. 5, the resin frame 24 is formed so as to almost cover the division bar 26. It should be noted that the resin frame 24 and the division bar 26 are not limited to have such a shape.

The second glass run vertical side 54 of the glass run 50 includes a first wall portion 54A disposed on the vehicle outer side, a second wall portion 54B disposed on the vehicle inner side so as to be apart from the first wall portion 54A with a certain distance, and a connection portion 54C connecting a rearward end of the first wall portion 54A and a rearward end of the second wall portion 54B. The second glass run vertical side 54 of the glass run 50 is formed so as to be open forward in a U-shape as seen in section, which is defined by the first wall portion 54A, the second wall portion 54B and the connection portion 54C.

The first wall portion 54A has a first lip 54D formed on a forward end so as to orthogonally extend rearward toward the second wall portion 54B. The first lip 54D is configured to have touch with the vehicle outer surface of the elevating window glass 106. The second wall portion 54B has a second lip 54E formed on a forward end so as to orthogonally extend rearward toward the first wall portion 54A. The second lip 54E is configured to have touch with the vehicle inner surface of the elevating window glass 106.

The first wall portion 54A has two lips 54F formed on two locations of a rearward end and a position between the rearward end and a forward end thereof so as to orthogonally extend forward toward the first wall portion 24A. The second wall portion 54B has a lip 54G formed on a location between a rearward end and a forward end thereof so as to orthogonally extend forward toward the U-shape opening. The second wall portion 54B has a lip 54H formed on a location between the rearward end and the forward end thereof so as to orthogonally extend forward toward the second wall portion 26B. It should be noted that the shape of the glass run 50 is not limited to the one illustrated in FIG. 5 and may be properly modified.

The leading edge 26D and the leading edge 26E of the division bar 26 are configured such that the distance between each other decreases as seen in section of the guide portion. In other words, the leading edge 26D and the leading edge 26E extend toward the first wall portion 54A and the second wall portion 54B of the second glass run vertical side 54, respectively. The distance between the leading edge 26D and the leading edge 26E of the division bar 26 is narrower than the width of the second glass run vertical side 54. Thus, the leading edge 26D and the leading edge 26E of the division bar 26 achieve a function of preventing the glass run 50 from detaching forward from the division bar 26 in the first embodiment.

Because the two lips 54F and the lip 54H are configured so as to be brought into contact with the leading edge 26D and the leading edge 26E of the division bar 26, the use of the lips 54F and the lip 54H may prevent more effectively the glass run 50 from detaching forward from the division bar 26.

As illustrated in FIG. 6, the clip 62 as the first coupler includes an insertion portion 62A, a shaft portion 62B and a head portion 62C. The insertion portion 62A is formed in a substantially conical shape so as to have a slant surface gradually tapered toward a leading edge thereof. The shaft portion 62B is formed in a column shape. The insertion portion 62A has a larger diameter than the shaft portion 62B at a portion thereof connecting with the shaft portion 62B such that a combination of the insertion portion 62A and the shaft portion 62B is formed in an arrowhead shape. The head portion 62C is formed in a disc shape. The head portion 62C has a larger diameter than the shaft portion 62B. The clip 62 is a part, which is applied to mechanically couple two members.

The connection portion 54C of the second glass run vertical side 54 has a through hole 54J formed therein. The through hole 54J permits the insertion portion 62A and the shaft portion 62B of the clip 62 to pass therethrough. In contrast, the through hole 54J and the head portion 62C are set in terms of dimension such that the head portion 62C is prevented from passing through the through hole 54J. The head portion 62C is configured to be brought into contact with a forward surface of the connection portion 54C.

The connection portion 26C of the division bar 26 has a through hole 26F formed at a position confronting the through hole 54J. The through hole 26F permits the insertion portion 62A and the shaft portion 62B of the clip 62 to pass therethrough. The connection portion 24C of the resin frame 24 has a through hole 24E formed at a position confronting the through hole 54J and the through hole 26F. The through hole 24E permits the insertion portion 62A and the shaft portion 62B of the clip 62 to pass therethrough. The through hole 24E of the resin frame 24 and the through hole 26F of the division bar 26 serve as a clip hole constituting a second coupler of the fixed window glass with a division bar 20.

As illustrated in FIG. 6, the clip 62 is inserted into the through hole 26F and the through hole 24E such that the insertion portion 62A and the shaft portion 62B pass through the through hole 26F and the through hole 24E. The clip 62 as the first coupler is coupled with the through hole 26F and the through hole 24E as the second coupler, determining the positional relationship between the glass run 50 and the fixed window glass with a division bar 20. The insertion portion 62A is preferably made of an elastic member or is configured to have a deformable structure. In this case, it is easy to insert the insertion portion 62A into the through hole 26F and the through hole 24E.

In the first embodiment, a washer 66 and an adhesive 68 may be disposed between the insertion portion 62A of the clip 62 and the division bar 26. The provision of the washer 66 and the adhesive 68 permits the clip 62 as the first coupler to be more firmly coupled with the through hole 26F and the through hole 24E as the second coupler. In place of the adhesive 68, a packing may be disposed.

Although the clip 62 is shown to have a structure including the insertion portion 62A, the shaft portion 62B and the head portion 62C, the clip is not limited to have such a structure. A known clip may be applicable.

As illustrated in FIG. 7, the resin frame 24 is attached to the outer periphery of the fixed window glass 22. The resin frame 24 is configured so as to be brought into contact with a frame 102A of the rear side door 102. The frame 102A has a door sealing member 110 attached thereto. The vehicle has a body sealing member 114 attached to a body 112 thereof so as to be brought into contact with the frame 102A. When the rear side door 102 is closed, the resin frame 24 and the door sealing member 110 are brought into contact with the body 112 while the frame 102A is brought into contact with the body sealing member 114. Thus, water or the like is prevented from entering the vehicle inner side.

As described above, the clip 62 is coupled with the through hole 26F and the through hole 24E as the clip holes, determining the positional relationship between the glass run 50 and the fixed window glass with a division bar 20, in the first embodiment. Further, the leading edges 26D and 26E of the division bar 26 prevent the glass run 50 from detaching. Thus, the glass run 50 and the separate, fixed window glass with a division bar 20 can be accurately assembled together, achieving a required function, such as water tightness.

Second Embodiment

Now, the vehicle window parts assembly 11 according to a second embodiment of the present invention will be described. Elements identical or similar to those of the first embodiment are denoted with like reference numerals or symbols, and explanation of these elements may be omitted.

Figure 8A:
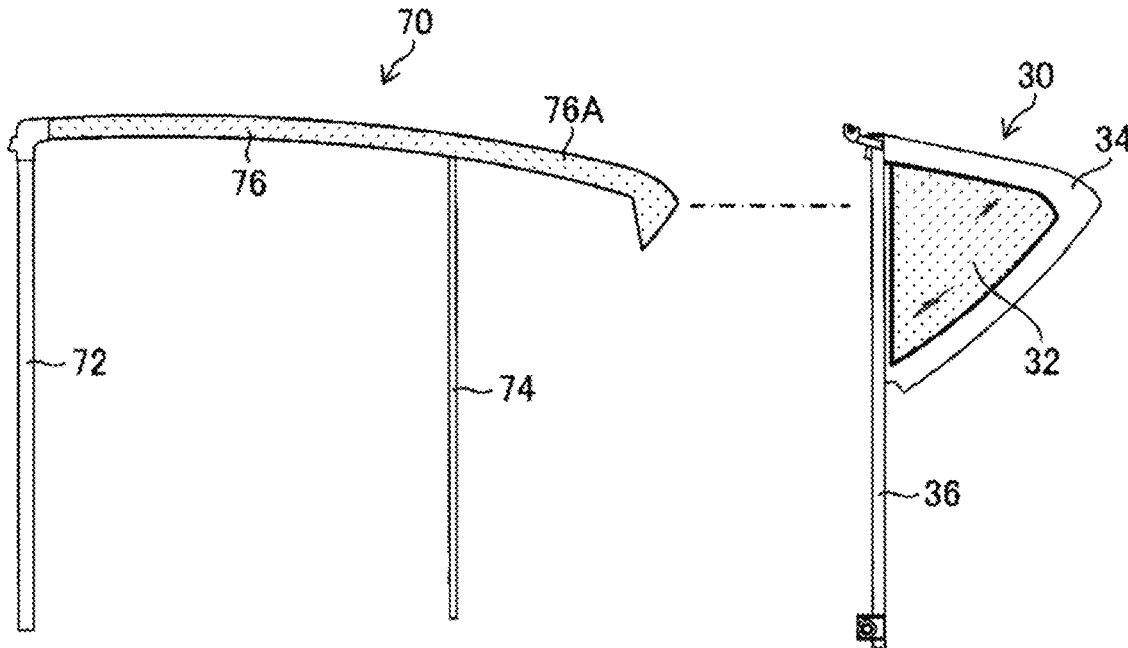
FIGS. 8A and 8B are views illustrating the structure of the vehicle window parts assembly according to a second embodiment, FIG. 8A being an exploded view of the vehicle window parts assembly, and FIG. 8B being a front view of the vehicle window parts assembly.
Figure 8B:
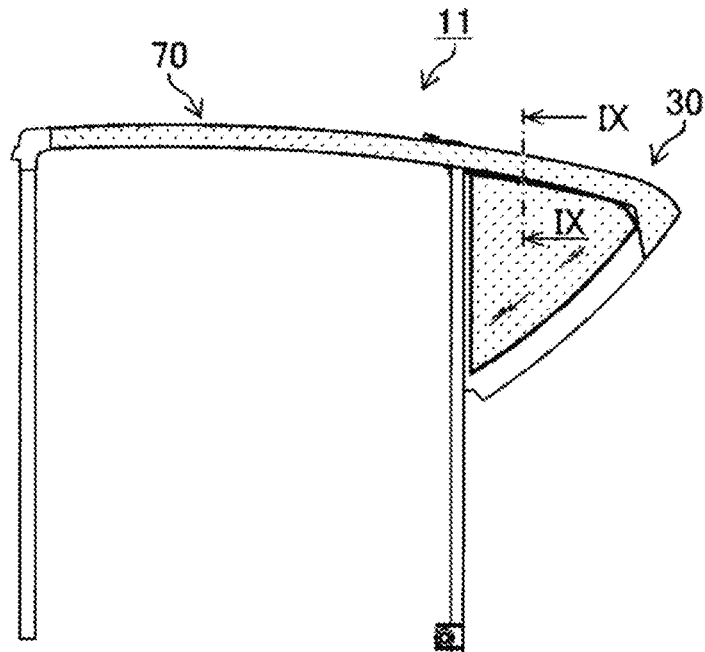

FIGS. 8A and 8B are views illustrating the structure of the vehicle window parts assembly 11 according to the second embodiment, FIG. 8A being an exploded view of the vehicle window parts assembly according to the second embodiment, and FIG. 8B being a front view of the vehicle window parts assembly according to the second embodiment.

As illustrated in FIG. 8A, the vehicle window parts assembly 11 according to the second embodiment has a glass run 70, which includes a first glass run vertical side 72, a second glass run vertical side 74, and a glass run upper side 76 connecting the first glass run vertical side 72 and the second glass run vertical side 74. The glass run upper side 76 includes an extension portion 76A, which extends to a position where the extension portion at least partially overlaps with the resin frame 34 as seen in front view.

The fixed window glass with a division bar 30 according to the second embodiment is configured as an integrally molded product including a fixed window glass 32, a resin frame 34 attached to an outer periphery of the fixed window glass 32, and a division bar 36. The fixed window glass with a division bar 30 according to the second embodiment may have the same structure as the fixed window glass with a division bar 20 according to the first embodiment. The fixed window glass 32 may have the same structure as the fixed window glass 22. The resin frame 34 may basically have the same structure as the resin frame 24 according to the first embodiment except for the overlapping portion with the extension portion 76A. The division bar 36 has a guide portion formed in a C-shape as seen in section as in the division bar 26 according to the first embodiment. The guide portion is configured such that the distance between both edges decreases as seen in section of the guide portion.

The fixed window glass with a division bar 30 and the glass run 70 are separately transported to a factory or the like. As illustrated in FIG. 8B, the fixed window glass with a division bar 30 and the glass run 70 are assembled together as the vehicle window parts assembly 11 there.

The second glass run vertical side 74, and the division bar 36 are coupled together in the same manner as the first embodiment (see FIG. 5). In the glass run 70, the glass run upper side 76 includes the extension portion 76A, which is different from the glass run 50 according to the first embodiment.

Figure 9:
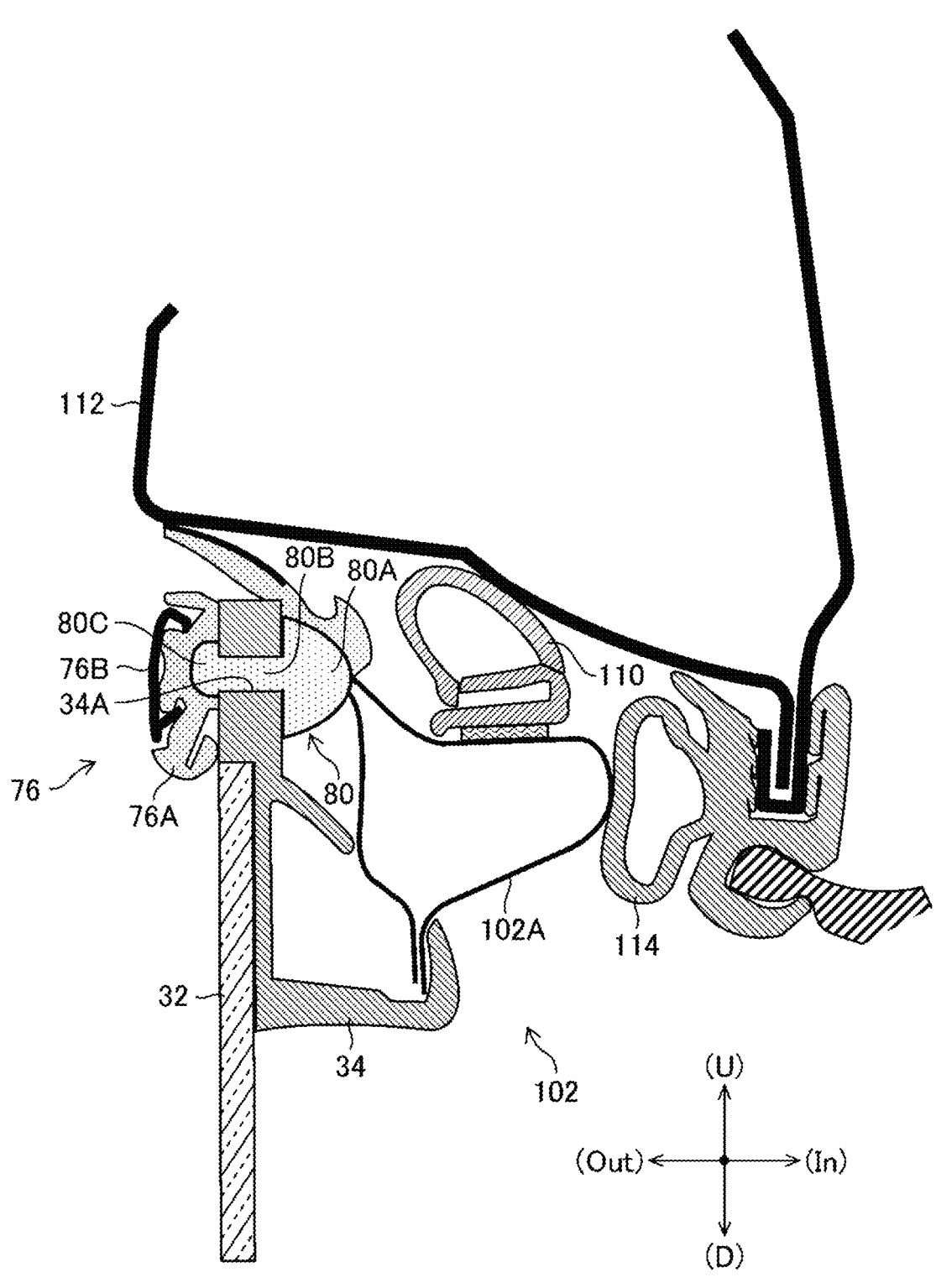
FIG. 9 is a cross-sectional view taken along line IX-IX of FIG. 8.

As illustrated in FIG. 9, the resin frame 34 is attached to the outer periphery of the fixed window glass 32. The resin frame 34 overlaps with the extension portion 76A of the glass run upper side 76. The extension portion 76A includes a clip 80 as the first coupler. The resin frame 34 has a through hole 34A formed therein to provide a clip hole as the second coupler. The clip 80 includes a head portion 80C to have contact with the resin frame 34, a shaft portion 80B to pass through the through hole 34A, and a caulking portion 80A having a larger diameter than the through hole 34A at a position where the caulking portion finishes to pass through the through hole 34A. The extension portion 76A may have a decorative molding 76B disposed on an outer surface thereof.

The caulking portion 80A may be fabricated in, e.g., the following procedure. The clip 80 is prepared so as to have the head portion 80C and the shaft portion 80B in a column shape. The shaft portion 80B is inserted into the through hole 34A such that the shaft portion 80B is projected from the resin frame 34 toward the vehicle inner side. A heated tip (not shown) is pressed against the projected shaft portion 80B to heat and melt the projected edge of the shaft portion 80B, forming the caulking portion 80A. Thus, the extension portion 76A of the glass run upper side 76 is brought into close contact with the resin frame via the clip 80, causing the fixed window glass with a division bar 30 and the glass run 70 to be firmly assembled together.

As described above, the clip 80 is coupled with the through hole 34A as the clip hole in the second embodiment, determining the positional relationship between the glass run 70 and the fixed window glass with a division bar 30. In accordance with the second embodiment, the guide portion in the division bar 36 is configured to have both edges brought closer to each other as seen in section, preventing the glass run 70 from detaching as in the first embodiment. Thus, the glass run 70 and the separate, fixed window glass with a division bar 30 can be accurately assembled together, achieving a required function, such as water tightness.

Third Embodiment

Now, the vehicle window parts assembly 12 according to a third embodiment of the present invention will be described. Elements identical or similar to those of the first and second embodiments are denoted with like reference numerals or symbols, and explanation of these elements may be omitted.

Figure 10A:
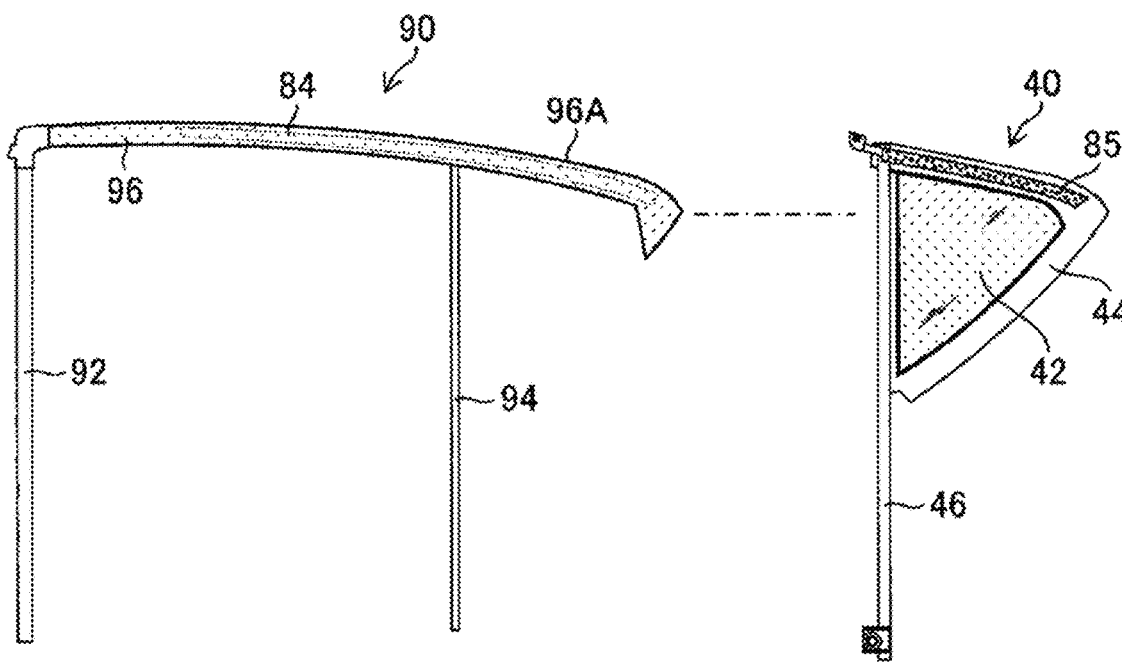
FIGS. 10A and 10B are views illustrating the structure of the vehicle window parts assembly according to a third embodiment, FIG. 10A being an exploded view of the vehicle window parts assembly, and FIG. 10B being a front view of the vehicle window parts assembly.
Figure 10B:
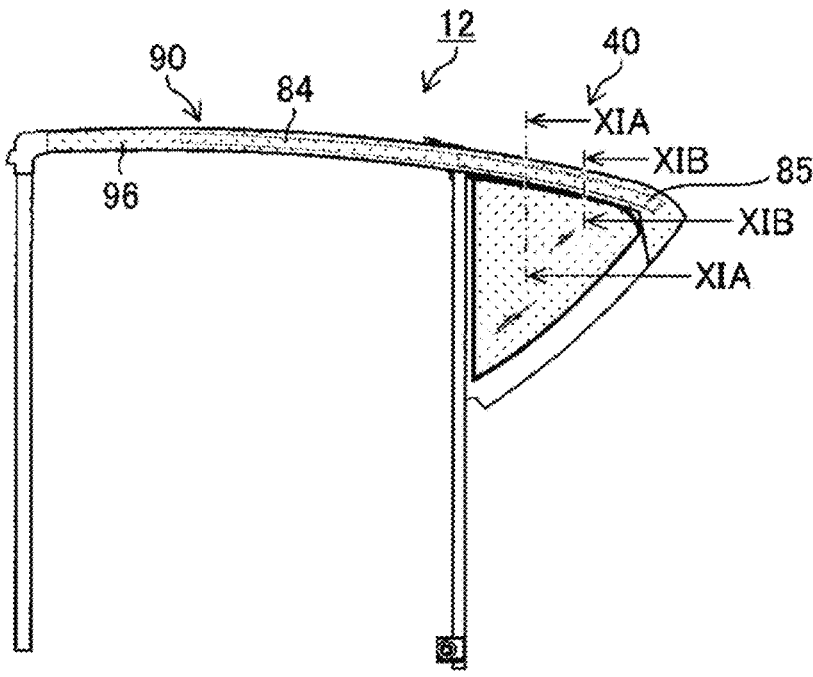

FIGS. 10A and 10B are views illustrating the structure of the vehicle window parts assembly 12 according to the third embodiment, FIG. 10A being an exploded view of the vehicle window parts assembly according to the third embodiment, and FIG. 10B being a front view of the vehicle window parts assembly according the third embodiment.

As illustrated in FIG. 10A, the vehicle window parts assembly 12 according to the third embodiment has a glass run 90, which includes a first glass run vertical side 92, a second glass run vertical side 94, and a glass run upper side 96 connecting the first glass run vertical side 92 and the second glass run vertical side 94. The glass run upper side 96 includes an extension portion 96A, which extends to a position where the extension portion at least partially overlaps with a resin frame 44 as seen in front view. The glass run 90 according to the third embodiment has the same structure as the glass run 70 according to the second embodiment.

In contrast, in the third embodiment, the glass run 90 has a double-sided tape 84 disposed on a side thereof facing the resin frame 44 so as to extend along the glass run upper side 96. The resin frame 44 has an adhesive base 85 disposed on a side thereof facing the double-sided tape 84. In the third embodiment, the double-sided tape 84 constitutes a third coupler while the adhesive base 85 constitutes a fourth coupler. The third coupler may be constituted by the adhesive base 85 while the fourth coupler may be constituted by the double-sided tape 84. The adhesive base 85 may be made of a flat plate to ensure a required adhesive force with the double-sided tape 84.

The fixed window glass with a division bar 40 according to the third embodiment is configured as an integrally molded product including a fixed window glass 42, the resin frame 44 attached to an outer periphery of the fixed window glass 42, and a division bar 46. The fixed window glass with a division bar 40 according to the third embodiment may basically have the same structure as the fixed window glass with a division bar 30 according to the second embodiment. The fixed window glass 42 may have the same structure as the fixed window glass 32. The resin frame 44 may basically have the same structure as the resin frame 34 according to the second embodiment except for an overlapping portion with the extension portion 96A. The division bar 46 has a guide portion formed in a C-shape as seen in section as in the division bar 36 according to the second embodiment. The guide portion is configured such that the distance between both edges decreases as seen in section of the guide portion.

The fixed window glass with a division bar 40 and the glass run 90 are separately transported to a factory or the like. As illustrated in FIG. 10B, the fixed window glass with a division bar 40 and the glass run 90 are assembled together as the vehicle window parts assembly 12 there.

The second glass run vertical side 94 and the division bar 46 are coupled together in the same manner as the first embodiment (see FIG. 5). In the glass run 90, the glass run upper side 96 includes the extension portion 96A, which is the same as the glass run 70 according to the second embodiment.

Figure 11A:
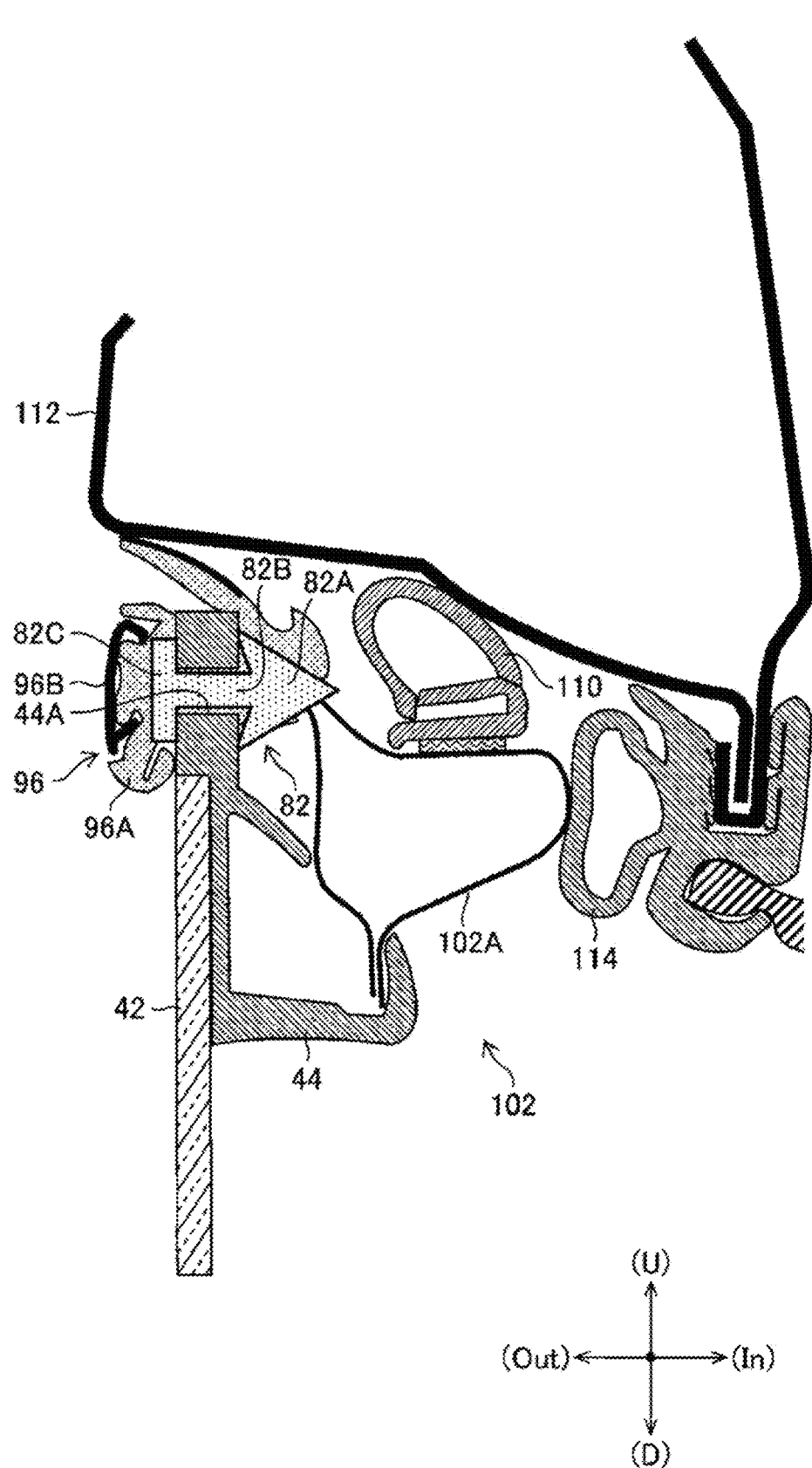
FIGS. 11A and 11B are cross-sectional views taken along line XIA-XIA and line XIB-XIB of FIG. 10B.

As illustrated in FIG. 11A, the resin frame 44 is attached to an outer periphery of the fixed window glass 42. The resin frame 44 overlaps with the extension portion 96A of the glass run upper side 96. The extension portion 96A includes a clip 82 as the first coupler. The resin frame 44 has a through hole 44A formed therein to provide a clip hole as the second coupler. The clip 82 includes a head portion 82C to have contact with the resin frame 44, a shaft portion 82B to pass through the through hole 44A, and an insertion portion 82A having a larger diameter than the through hole 44A. The clip 82 may have the structure of the clip 62 according to the first embodiment illustrated in FIG. 6. A combination of the clip 82 as the first coupler and the through hole 44A constituting the clip hole as the second coupler determines the positional relationship between the glass run 90 and the fixed window glass with a division bar 40. The extension portion 96A may have a decorative molding 96B disposed on an outer surface.

Figure 11B:
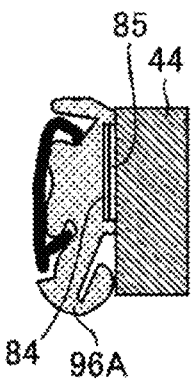

As illustrated in FIG. 11B, between the extension portion 96A of the glass run upper side 96 and the resin frame 44 are disposed a double-sided tape 84 as the third coupler and an adhesive base 85 as the fourth coupler such that both of the double-sided tape and the adhesive base are bonded together. Thus, the third coupler and the fourth coupler are coupled together. Not only the connection between the clip 82 as the first coupler and the through hole 44A as the second coupler but also the connection between the double-sided tape 84 as the third coupler and the adhesive base as the fourth coupler more firmly determines the positional relationship between the glass run 90 and the fixed window glass with a division bar 40.

In accordance with the third embodiment, the guide portion in the division bar 46 is configured to have both edges brought closer to each other as seen in section, preventing the glass run 90 from detaching as in the first embodiment. Thus, the glass run 90 and the separate, fixed window glass with a division bar 40 can be accurately assembled together, achieving a required function, such as water tightness.

Fourth Embodiment

Now, the vehicle window parts assembly 13 according to a fourth embodiment of the present invention will be described. Elements identical or similar to those of the first to third embodiments are denoted with like reference numerals or symbols, and explanation of these elements may be omitted.

Figure 12A:
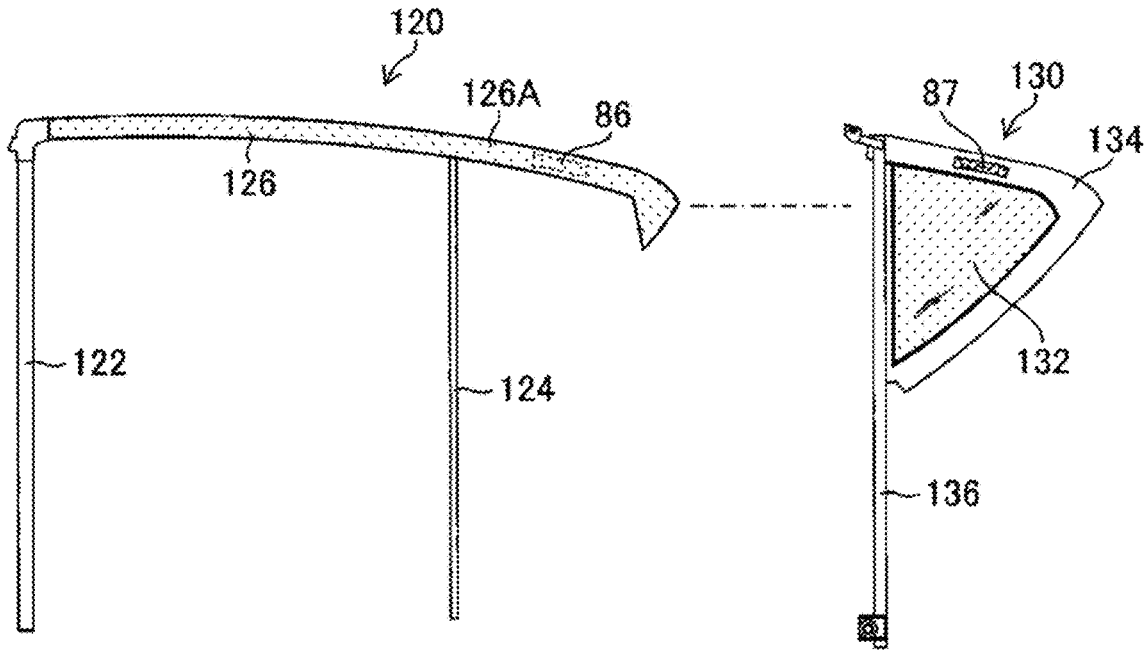
FIGS. 12A and 12B are views illustrating the structure of the vehicle window parts assembly according to a fourth embodiment, FIG. 12A being an exploded view of the vehicle window parts assembly, and FIG. 12B being a front view of the vehicle window parts assembly.
Figure 12B:
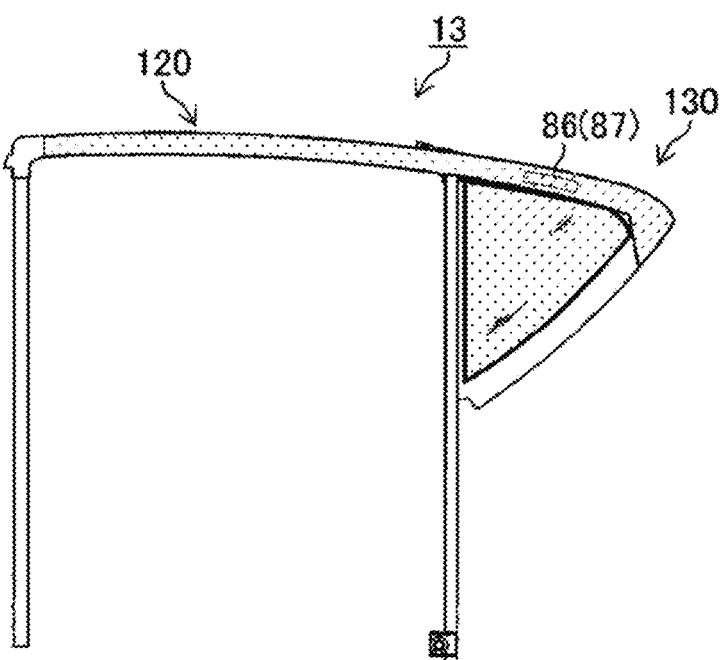

FIGS. 12A and 12B are views illustrating the structure of the vehicle window parts assembly 13 according to the fourth embodiment, FIG. 12A being an exploded view of vehicle window parts assembly according to the fourth embodiment, and FIG. 12B being a front view of the vehicle window parts assembly according to the fourth embodiment.

As illustrated in FIG. 12A, the vehicle window parts assembly 13 according to the fourth embodiment has a glass run 120, which includes a first glass run vertical side 122, a second glass run vertical side 124, and a glass run upper side 126 connecting the first glass run vertical side 122 and the second glass run vertical side 124. The glass run upper side 126 includes an extension portion 126A, which extends to a position where the extension portion at least partially overlaps with a resin frame 134 of the vehicle window parts assembly 13 according to the fourth embodiment. The glass run 120 according to the fourth embodiment has the same structure as the glass run 90 according to the third embodiment.

In contrast, in the fourth embodiment, the glass run 120 has a first sheet 86 disposed on a side thereof facing the resin frame 134 so as to extend along the extension portion 126A of the glass run upper side 126, the first sheet constituting one of a pair of surface fasteners. The resin frame 134 has a second sheet 87 disposed on a side thereof facing the first sheet 86, the second sheet constituting the other of the paired surface fasteners.

The fixed window glass with a revision bar 130 according to the fourth embodiment is configured as an integrally molded product including a fixed window glass 132, the resin frame 134 attached to an outer periphery of the fixed window glass 132, and a division bar 136.

The fixed window glass with a division bar 130 according to the fourth embodiment has the same structure as the fixed window glass with a division bar 40 according to the third embodiment. The fixed window glass 132 has the same structure as the fixed window glass 32 according to the second embodiment. The resin frame 134 basically has the same structure as the resin frame 44 according to the third embodiment except for the overlapping portion with the extension portion 126A. The division bar 136 has a guide portion formed in a C-shape as seen in section as in the division bar 46 according to the third embodiment. The guide portion is configured such that the distance between both edges decreases as seen in section of the guide portion.

The fixed window glass with a division bar 130 and the glass run 120 are separately transported to a factory or the like. As illustrated in FIG. 12B, the fixed window glass with a division bar 130 and the glass run 120 are assembled together as the vehicle window parts assembly 13 there. It should be noted that the extension portion 126A has a decorative molding (not shown) disposed on a vehicle outer surface.

The second glass run vertical side 124 and the division bar 136 are coupled together in the same manner as the first embodiment (FIG. 5). In the glass run 120, the glass run upper side 126 includes the extension portion 126A as in the glass run 90 according to the third embodiment.

In the fourth embodiment, the first sheet 86 and the second sheet 87 constitute the paired surface fasteners, which serve as the third coupler and the fourth coupler.

The fourth embodiment has a similar sectional structure to the sectional structure of the third embodiment illustrated in FIG. 11B. In the fourth embodiment, a combination of the first sheet 86 and the second sheet 87, which constitute the paired surface fasteners, is disposed in place of the combination of the double-sided tape 84 and the adhesive base 85 according to the third embodiment illustrated in FIG. 11B. Examples of the paired surface fasteners (the first sheet 86 and the second sheet 87) include a hook-and-loop fastener, a dual lock fastener, and any known surface fasteners.

As illustrated in FIG. 12B, the paired surface fasteners constitute the third coupler and the fourth coupler between the extension portion 126A of the glass run upper side 126 and the resin frame 134, and the third coupler and fourth coupler are coupled together.

In the fourth embodiment, the clip (not shown) as the first coupler and the through hole as the second coupler (not shown) in the resin frame 134 are connected together as in the third embodiment. The third coupler and the fourth coupler are coupled together in the form of the paired surface fasteners, more firmly determining the positional relationship between the glass run 120 and the fixed window glass with a division bar 130.

In the fourth embodiment, the guide portion in the division bar 136 is configured to have both edges brought closer to each other as seen in section, preventing the glass run 120 from detaching as in the first embodiment. Thus, the glass run 120 and the separate, fixed window glass with a division bar 130 can be accurately assembled together, achieving a required function, such as water tightness.

Fifth Embodiment

Now, the vehicle window parts assembly according to a fifth embodiment of the present invention will be described. Elements identical or similar to those of the first to fourth embodiments are denoted with like reference numerals or symbols, and explanation of these elements may be omitted.

Figure 13A:
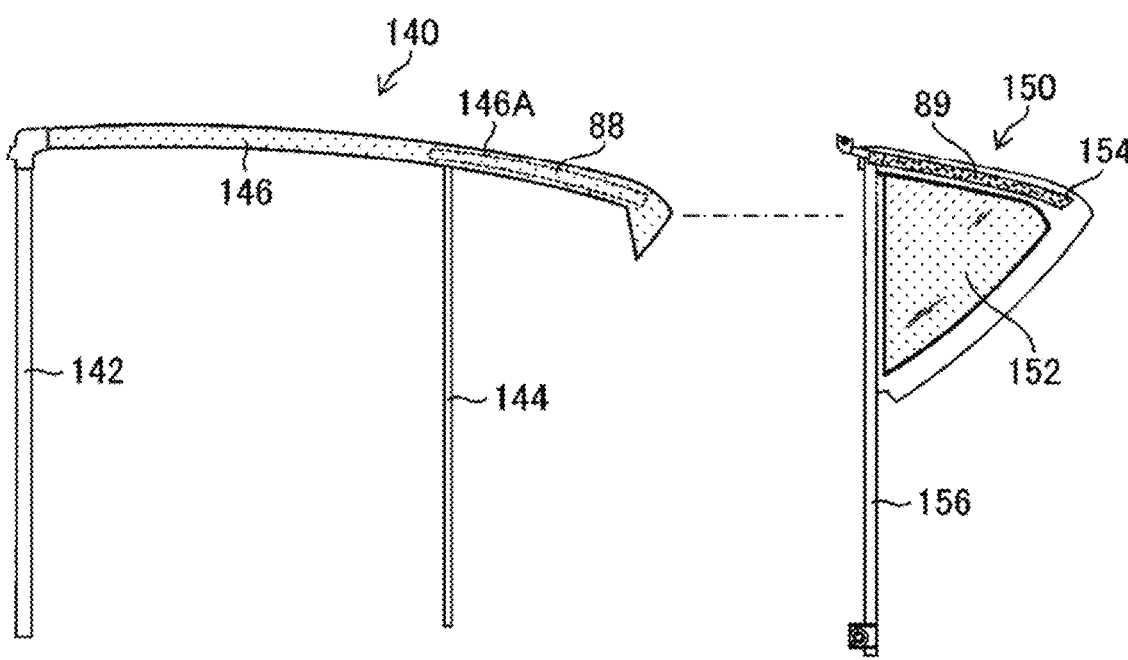
FIGS. 13A and 13B are views illustrating the structure of the vehicle window parts assembly according to a fifth embodiment, FIG. 13A being an exploded view of the vehicle window parts assembly, and FIG. 13B being a front view of the vehicle window parts assembly.
Figure 13B:
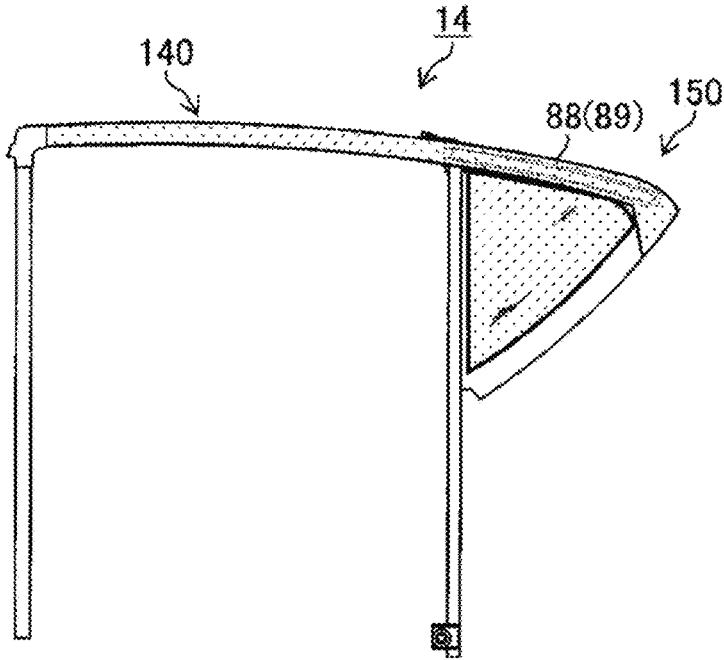

FIGS. 13A and 13B are views illustrating the structure of the vehicle window parts assembly 14 according to the fifth embodiment, FIG. 13A being an exploded view of the vehicle window parts assembly according to the fifth embodiment, and FIG. 13B being a front view of the vehicle window parts assembly according to the fifth embodiment.

As illustrated in FIG. 13A, the vehicle window parts assembly 14 according to the fifth embodiment has a glass run 140, which includes a first glass run vertical side 142, a second glass run vertical side 144, and a glass run upper side 146 connecting the first glass run vertical side 142 and the second glass run vertical side 144. The glass run upper side 146 includes an extension portion 146A, which extends to a position where the extension portion at least partially overlaps with a resin frame 154 of the vehicle window parts assembly 14 according to the fifth embodiment as seen in front view. The glass run 140 according to the fifth embodiment has the same structure as the glass run 120 according to the fourth embodiment.

In contrast, in the fifth embodiment, the glass run 140 has an adhesive 88 disposed on a side thereof facing the resin frame 154 so as to extend along the extension portion 146A of the glass run upper side 146. The resin frame 154 has an adhesive base 89 disposed on a side thereof facing the adhesive 88. In the fifth embodiment, the adhesive 88 constitutes the third coupler while the adhesive base 89 constitutes the fourth coupler. As the adhesive 88, an epoxy resin-based adhesive, a urethane resin-based adhesive, a modified silicone-based adhesive, a denatured silicone-based adhesive or a hotmelt-based adhesive is applicable. The third coupler may be constituted by the adhesive base 89 while the fourth coupler may be constituted by the adhesive 88. The adhesive base 89 may be made of a flat plate to ensure a required adhesive force with the adhesive 88. The fifth embodiment basically has the same structure as the sectional structure of the third embodiment illustrated in FIGS. 11A and 11B. In the fifth embodiment, a combination of the adhesive 88 and the adhesive base 89 is disposed in place of the combination of the double-sided tape 84 and the adhesive base 85 according to the third embodiment illustrated in FIG. 11B.

The fixed window glass with a division bar 150 according to the fifth embodiment is configured as an integrally molded product including a fixed window glass 152, the resin frame 154 attached to an outer periphery of the fixed window glass 152, and a division bar 156.

The fixed window glass with a division bar 150 according to the fifth embodiment has the same as the fixed window glass with a division bar 130 according to the fourth embodiment. The fixed window glass 152 may have the same structure as the fixed window glass 132. The resin frame 154 may basically have the same structure as the resin frame 134 except for an overlapping portion with the extension portion 146A. The division bar 156 has a guide portion formed in a C-shape in section as in the division bar 136, and the guide portion is configured such that the distance between both edges decreases as seen in section of the guide portion.

The fixed window glass with a division bar 150 and the glass run 140 are separately transported to a factory or the like. The fixed window glass with a division bar 150 and the glass run 140 are assembled together as the vehicle window parts assembly 14 as illustrated in FIG. 13B. It should be noted that the extension portion 146A may have a different molding (not shown) disposed on a vehicle outer surface.

The second glass run vertical side 144 and the division bar 156 may be attached in the same manner as the first embodiment (see FIG. 5). In the glass run 140, the glass run upper side 146 includes the extension portion 146A as in the glass run 120 according to the fourth embodiment.

The adhesive 88 as the third coupler and the adhesive base 89 as the fourth coupler are disposed between the extension portion 146A of the glass run upper side 146 and the resin frame 154, both of the adhesive and the adhesive base are bonded together. Thus, the third coupler and the fourth coupler are coupled together.

In the fifth embodiment, the clip (not shown) as the first coupler and the through hole (not shown) in the resin frame 154 as the second coupler are coupled together. Further the adhesive 88 as the third coupler and the adhesive base 89 as the fourth coupler are coupled together, more firmly the position relationship between the glass run 140 and the fixed window glass with a division bar 150.

In the fifth embodiment, the guide portion in the division bar 156 is configured to have both edges brought closer to each other as seen in section, preventing the glass run 140 from detaching as in the first embodiment. Thus, the glass run 140 and the separate, fixed window glass with a division bar 150 can be accurately assembled together, achieving a required function, such as water tightness.

Explanation of the first to fifth embodiments is made about the rear side door 102. The fixed window glass with a division bar according to the present invention is also applicable to a front side door. The first glass run vertical side may be attached to the fixed window glass with a division bar.

EXPLANATION OF REFERENCE SYMBOLS 10, 11, 12, 13 and 14: vehicle window parts assembly, 20: fixed window glass with division bar, 22: fixed window glass, 24: resin frame, 24A: first wall portion, 24B: second wall portion, 24C: connection portion, 24D: fixing portion, 24E: through hole, 26: division bar, 26A: first wall portion, 26B: second wall portion, 26C: connection portion, 26D: leading edge, 26E: leading edge, 26F: through hole, 27: fixing member, 28: fixing member, 30: fixed window glass with division bar, 32: fixed window glass, 34: resin frame, 34A: through hole, 36: division bar, 40: fixed window glass with division bar, 42: fixed window glass, 44: resin frame, 44A: through hole, 46: division bar, 50: glass run, 52: first glass run vertical side: 54: second glass run vertical side, 54A: first wall portion, 54B: second wall portion, 54C: connection portion, 54D: first lip, 54E: second lip, 54F: lip, 54G: lip, 54H: lip, 54J: through hole, 56: glass run upper side, 58: forward connection portion, 60: rearward connection portion, 62: clip, 62A: insertion portion, 62B: shaft portion, 62C: head portion, 66: washer, 68: adhesive, 70: glass run, 72: first glass run vertical side, 74: second glass run vertical side, 76: glass run upper side, 76A: extension portion, 76B: decorative molding, 80: clip, 80A: caulking portion, 80B: shaft portion, 80C: head portion, 82: clip, 82A: insertion portion, 82B: shaft portion, 82C: head portion, 84: double-sided tape, 85: adhesive base, 86: first sheet, 87: second sheet, 88: adhesive, 89: adhesive base, 90: glass run, 92: first glass run vertical side, 94: second glass run vertical side, 96: glass run upper side, 94A: extension portion, 96B: decorative molding, 100: vehicle, 102: rear side door, 102A: frame, 104: window opening, 106: elevating window glass, 108: elevating system, 110: door sealing member, 112: body, 114: body sealing member, 120: glass run, 122: first glass run vertical side, 124: second glass run vertical side, 126: glass run upper side, 126A: extension portion, 130: fixed window glass with division bar, 132: fixed window glass, 134: resin frame, 136: division bar, 140: glass run, 142: first glass run vertical side, 144: second glass run vertical side, 146: glass run upper side, 146A: extension portion, 150: fixed window glass with division bar, 152: fixed window glass, 154: resin frame, 156: division bar

What is claimed is:

1. A vehicle window parts assembly comprising:
a fixed window glass having an outer periphery, a resin frame attached to the periphery, and a division bar attached to a surface of the resin frame opposite to the fixed window glass and having a guide portion formed therein, such that the resin frame and the division bar are integrally molded to the fixed window glass as an integral molded product; and
a glass run including a first glass run vertical side, a second glass run vertical side, and a glass run upper side connecting the first glass run vertical side and the second glass run vertical side;
wherein the glass run further includes a first coupler, and the assembly further includes a second coupler to be coupled to the first coupler such that the first coupler and the second coupler are coupled together;
wherein the guide portion receives either one of the first glass run vertical side and the second glass run vertical side;
wherein the guide portion is formed in a C-shape in section such that the guide portion has both edges formed so as to have a decreasing distance therebetween;
wherein the distance between both edges of the guide portion is shorter than a width of the first glass run vertical side or the second glass run vertical side, and
wherein the first coupler comprises an insertion portion, a head portion and a shaft portion between the insertion portion and the head portion, the insertion portion has a diameter larger than that of the shaft portion, the head portion has a diameter larger than that of the shaft portion,
the second coupler is a clip hole comprising a through hole in the resin frame and a through hole in the division bar, and the shaft portion are passing through the clip hole so that the insertion portion and the head portion are on opposite sides of the clip hole.

2. The vehicle window parts assembly according to claim 1, wherein the head portion is in contact with the resin frame and the insertion portion is a caulking portion.

3. The vehicle window parts assembly according to claim 1, wherein the insertion portion is an elastic member or a deformable member.

4. The vehicle windows parts assembly according to claim 1, wherein the insertion portion and the shaft portion have together an arrowhead shape.

5. The vehicle windows parts assembly according to claim 1, further comprising a washer and an adhesive between the insertion portion and the division bar.

6. A vehicle window parts assembly comprising:
a fixed window glass having an outer periphery, a resin frame attached to the periphery, and a division bar attached to a surface of the resin frame opposite to the fixed window glass and having a guide portion formed therein, such that the resin frame and the division bar are integrally molded to the fixed window glass as an integral molded product; and
a glass run including a first glass run vertical side, a second glass run vertical side, and a glass run upper side connecting the first glass run vertical side and the second glass run vertical side and having an extension portion extending to a position where the extension portion at least partially overlaps with the resin frame as seen in front view;
wherein the extension portion further includes a first coupler, and the assembly further includes a second coupler to be coupled to the first coupler such that the first coupler and the second coupler are coupled together;
wherein the guide portion receives either one of the first glass run vertical side and the second glass run vertical side;
wherein the guide portion is formed in a C-shape in section such that the guide portion has both edges formed so as to have a decreasing distance therebetween;
wherein the distance between both edges of the guide portion is shorter than a width of the first glass run vertical side or the second glass run vertical side,
wherein the first coupler comprises an insertion portion, a head portion and a shaft portion between the insertion portion and the head portion, the insertion portion has a diameter larger than that of the shaft portion, the head portion has a diameter larger than that of the shaft portion,
the second coupler is a clip hole comprising a through hole in the resin frame and a through hole in the division bar, and
the shaft portion passes through the clip hole so that the insertion portion and the head portion are on opposite sides of the clip hole.

7. The vehicle window parts assembly according to claim 6, wherein the extension portion includes a third coupler, and the assembly further comprises a fourth coupler to be coupled with the third coupler such that the third coupler and the fourth coupler are coupled together.

8. The vehicle window parts assembly according to claim 7, wherein one of the third coupler and the fourth coupler comprises a double-sided tape while the other comprises an adhesive base.

9. The vehicle window parts assembly according to claim 7, wherein a combination of the third coupler and the fourth coupler comprises a pair of surface fasteners.

10. The vehicle window parts assembly according to claim 7, wherein one of the third coupler and the fourth coupler comprises an adhesive while the other comprises an adhesive base.

11. The vehicle window parts assembly according to claim 6, wherein the head portion is in contact with the resin frame and the insertion portion is a caulking portion.

12. The vehicle window parts assembly according to claim 6, wherein the insertion portion is an elastic member or a deformable member.

13. The vehicle windows parts assembly according to claim 6, wherein the insertion portion and the shaft portion have together an arrowhead shape.

14. The vehicle windows parts assembly according to claim 6, further comprising a washer and an adhesive between the insertion portion and the division bar.

* * * * *